United States Patent
Terashima et al.

(10) Patent No.: US 7,223,715 B2
(45) Date of Patent: May 29, 2007

(54) PURIFICATION CATALYST, PREPARATION PROCESS THEREFOR AND GAS-PURIFYING APPARATUS

(75) Inventors: Tetsuo Terashima, Neyagawa (JP); Tatsuo Fujita, Osaka (JP); Motohiro Suzuki, Osaka (JP); Masato Hosaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 643 days.

(21) Appl. No.: 10/225,792

(22) Filed: Aug. 22, 2002

(65) Prior Publication Data

US 2003/0078161 A1    Apr. 24, 2003

(30) Foreign Application Priority Data

Oct. 19, 2001  (JP)  ............... 2001-321667
Feb. 8, 2002   (JP)  ............... 2002-032097

(51) Int. Cl.
*B01J 23/42* (2006.01)
*B01J 23/44* (2006.01)
*B01J 23/00* (2006.01)
*B01J 23/02* (2006.01)
*B01J 21/04* (2006.01)

(52) U.S. Cl. ............... 502/339; 502/302; 502/304; 502/308; 502/313; 502/321; 502/326; 502/349; 502/439

(58) Field of Classification Search ............... 502/302, 502/304, 308, 309, 313, 321, 326, 339, 349, 502/350, 439
See application file for complete search history.

(56) References Cited

U.S. PATENT DOCUMENTS

| | | | | |
|---|---|---|---|---|
| 4,328,294 A | * | 5/1982 | Tanaka et al. | 429/304 |
| 4,328,296 A | * | 5/1982 | Tanaka et al. | 429/304 |
| 4,904,633 A | | 2/1990 | Ohata et al. | |
| 5,011,673 A | * | 4/1991 | Kriechbaum et al. | 423/608 |
| 5,015,617 A | * | 5/1991 | Ohata et al. | 502/304 |
| 5,145,825 A | * | 9/1992 | Deeba et al. | 502/242 |
| 5,212,142 A | * | 5/1993 | Dettling | 502/304 |
| 5,252,316 A | * | 10/1993 | Kriechbaum et al. | 423/608 |
| 5,254,519 A | * | 10/1993 | Wan et al. | 502/252 |
| 5,318,765 A | * | 6/1994 | Binder et al. | 423/608 |

(Continued)

FOREIGN PATENT DOCUMENTS

| CA | 1020587 A | 9/1988 |
|---|---|---|
| JP | 2000-246106 | 9/2000 |

OTHER PUBLICATIONS

Chinese Office Action dated Dec. 5, 2003 for Application No. 02142017.3.
Korean Office Action dated Apr. 28, 2005.

*Primary Examiner*—Cam N. Nguyen
(74) *Attorney, Agent, or Firm*—RatnerPrestia

(57) ABSTRACT

A purification catalyst and a gas-purifying apparatus are provided which are capable of sufficiently purifying a gas subject to treatment at low temperatures. The purification catalyst includes $ZrO_2$ having a specific surface area of 50 $m^2/g$ or less and a monoclinic crystal system. The gas-purifying apparatus includes the aforementioned purification catalyst as a first purification catalyst, and a second purification catalyst containing Mn as a major component and disposed upstream of the first purification catalyst.

6 Claims, 4 Drawing Sheets

U.S. PATENT DOCUMENTS

| | | | |
|---|---|---|---|
| 6,030,914 A * | 2/2000 | Matsui | 501/103 |
| 6,034,029 A * | 3/2000 | Wulff-Doring et al. | 502/308 |
| 6,087,285 A * | 7/2000 | Oomichi et al. | 501/103 |
| 6,152,975 A * | 11/2000 | Elliott et al. | 48/197 R |
| 6,228,799 B1 * | 5/2001 | Aubert et al. | 502/304 |
| 6,326,329 B1 * | 12/2001 | Nunan | 502/242 |
| 6,395,381 B1 * | 5/2002 | Kondo et al. | 428/317.9 |
| 6,420,305 B1 * | 7/2002 | Matsuzawa et al. | 502/222 |
| 6,521,566 B1 * | 2/2003 | Magno et al. | 502/325 |
| 6,524,548 B1 * | 2/2003 | Mangold et al. | 423/608 |
| 6,562,747 B2 * | 5/2003 | Symons et al. | 501/103 |
| 6,576,804 B1 * | 6/2003 | Heineke et al. | 585/661 |
| 2001/0036437 A1 * | 11/2001 | Gutsch et al. | 423/610 |
| 2002/0136686 A1 | 9/2002 | Takahashi | |
| 2003/0206854 A1 * | 11/2003 | Gutsch et al. | 423/625 |
| 2005/0085381 A1 * | 4/2005 | Irgang et al. | 502/349 |

* cited by examiner

PURIFICATION CATALYST, PREPARATION PROCESS THEREFOR AND GAS-PURIFYING APPARATUS

BACKGROUND OF THE INVENTION

1. Field of the Invention

The present invention relates to purification of gases containing harmful substances produced in manufacturing processes, transportation, combustion, waste disposal and the like in the industrial and consumer fields and, particularly, to a gas-purifying apparatus of purifying a gas discharged from garbage disposal, a purification catalyst for use therein and a preparation process therefor.

2. Description of the Related Art

In the gas purification technology gas purification methods of the adsortion type, ozone oxidation type, oxidative decomposition (combustion) type, biodegradation type and the like have been developed and improved in recent years. Among these methods, the method of the oxidative decomposition type using a catalyst has an advantage that it allows a garbage disposal apparatus which continually produces bad smell, to be rendered compact and maintenance-free and, hence, a gas-purifying apparatus employing this method has been put to practical use. Generally, activated alumina ($Al_2O_3$) carrying Pt or Pd is used as such a purification catalyst in combination with heating means such as a heater.

However, such a conventional gas-purifying apparatus employing the aforementioned catalytic oxidation method cannot sufficiently exhibit its ability under low temperature conditions at about 250° C. or below.

Garbage disposal apparatuses of the heat-drying type, bio-treatment type using microorganism and a like type that have been developed in recent years raise a problem that a gas produced therefrom gives off a bad smell. For this reason, the development of a gas-purifying apparatus having a higher gas-purifying ability at lower temperatures has been demanded.

Such a bad smell produced from a garbage disposal apparatus mainly comprises an organic sulfur compound, ammonia or an amine, a fatty acid such as acetic acid, propionic acid or valeric acid, and a combustible compound such as aldehyde or alcohol. One of the causes of a bad smell given off from a conventional garbage disposal apparatus is that a catalyst used cannot exhibit its catalytic performance sufficiently due to coexistence of various such smell components and moisture produced from garbage.

Among such smell components produced during garbage disposal, such compounds as methyl sulfide and methyl disulfide are hard to decompose at low temperatures in particular unlike hydrogen sulfide or the like. These sulfur oxides have raised a problem that they are easy to remain at a catalyst and act as poisoning substances with respect to the catalyst. On the other hand, such water-soluble compounds as amines and fatty acids have raised a problem that their decomposition activity is considerably lowered with increasing amount of moisture in a gas to be treated or that the coexistence of such a water-soluble compound with a sulfur-type smell causes poisoning of such coexistent gases, which suppresses their respective decomposition activity.

The present invention has been made in view of the foregoing problems associated with catalytic purification performed by a conventional gas-purifying apparatus using a catalyst, particularly by a garbage disposal apparatus, which problems become serious at low temperatures. Accordingly, it is an object of the present invention to provide a purification catalyst and a gas-purifying apparatus which are capable of rapidly removing a smell and harmful substances satisfactorily at relatively low temperatures even if the gas to be purified contains moisture and a great variety of coexistent gas components.

SUMMARY OF THE INVENTION

One aspect of the present invention is a purification catalyst comprising a carrier formed of $ZrO_2$ having a monoclinic crystal system, and a platinum group metal carried by the carrier.

Another aspect of the present invention is the purification catalyst, wherein the $ZrO_2$ has a specific surface area of 50 $m^2/g$ or less.

Still another aspect of the present invention is a purification catalyst comprising a catalyst layer formed through a process of applying a catalyst slurry comprising a metal oxide carrying a platinum group metal, onto a substrate, wherein the platinum group metal results from a reducing treatment of a salt of the platinum group metal.

Yet still another aspect of the present invention is the purification catalyst, wherein the metal oxide comprises $ZrO_2$ as a major component thereof, the $ZrO_2$ having a specific surface area of 50 $m^2/g$ or less and a monoclinic crystal system.

Still yet another aspect of the present invention is the purification catalyst, wherein the $ZrO_2$ carries a metal oxide of an element selected, from the group consisting of Ce, Ti, Mo, Tb and Eu in a total amount of from 0.5 to 30 wt %.

A further aspect of the present invention is a process for preparing a catalyst, comprising the steps of:

heat-treating $ZrO_2$ having at least a monoclinic crystal system at 700° C. or above;

allowing the $ZrO_2$ thus heat-treated to be impregnated with an aqueous solution of a platinum group metal, followed by a heat treatment;

pulverizing the $ZrO_2$ carrying the platinum group metal and mixing the $ZrO_2$ thus pulverized with water, a water-soluble polymer and a water-soluble Zr salt to give a catalyst slurry; and applying the slurry onto a substrate formed of a ceramic, a metal or carbon.

A still further aspect of the present invention is a process for preparing a purification catalyst, comprising the steps of:

mixing a metal oxide with at least an aqueous solution of a salt of a platinum group metal and a water-soluble polymer material and heat-treating the resulting mixture;

pulverizing the metal oxide carrying the platinum group metal and mixing the metal oxide thus pulverized with water to give a catalyst slurry; and applying the slurry onto a substrate formed of a ceramic, a metal or carbon.

A yet further aspect of the present invention is a gas-purifying apparatus comprising a purification catalyst as recited in any one of 1st, 3rd and 4th inventions, means of heating the purification catalyst, an inlet for introducing a gas to be treated into the gas-purifying apparatus, and an off-gas outlet for discharging an off-gas, wherein:

the purification catalyst is a first purification catalyst; and a metal oxide comprising Mn as a major component thereof is further provided as a second purification catalyst disposed upstream of the first purification catalyst.

A still yet further aspect of the present invention is the gas-purifying apparatus, wherein the temperature of the first purification catalyst is 250° C. or below.

An additional aspect of the present invention is the gas-purifying apparatus, wherein the temperature of the second purification catalyst is lower than that of the first purification catalyst.

A still additional aspect of the present invention is the gas-purifying apparatus, wherein the temperature of the second purification catalyst is adjusted to 250° C. or below.

A yet additional aspect of the present invention is the gas-purifying apparatus, wherein the second purification catalyst comprises a composite oxide comprising Mn and at least one element selected from the group consisting of Co, W, Mo and V.

A still yet additional aspect of the present invention is the gas-purifying apparatus, wherein the concentration of Co, W, Mo or V rendered composite with Mn in the second purification catalyst increases with a gradient in a direction toward the surface of a catalyst layer.

A supplementary aspect of the present invention is the gas-purifying apparatus, wherein the second purification catalyst comprises a composite oxide comprising Mn and at least one element selected from the group consisting of Ag, Fe, Cu, Ce and Zr.

A still supplementaiy aspect of the present invention is the gas-purifying apparatus, wherein the concentration of Ag, Fe, Cu, Ce or Zr rendered composite with Mn in the second purification catalyst decreases with a gradient in a direction toward the surface of a catalyst layer.

A yet supplementary aspect of the present invention is the gas-purifying apparatus, wherein the second purification catalyst comprises Mn and zeolite carrying an alkali metal.

A still yet supplementary aspect of the present invention is the gas-purifying apparatus, wherein the second purification catalyst comprises a first catalyst layer comprising the zeolite carrying the alkali metal as a major component thereof, and a second catalyst layer overlying the first catalyst layer and comprising a transition metal oxide containing Mn as a major component thereof.

Another aspect of the present invention is the gas-purifying apparatus, wherein the Mn is of β-structure.

DETAILED DESCRIPTION OF THE PREFERRED EMBODIMENTS

A purification catalyst for use in the present invention uses $ZrO_2$ as a carrier carrying a platinum group metal. Particularly, such a platinum group metal carried by $ZrO_2$ preferably comprises Pt or Rh either alone or as a composite. $ZrO_2$ for use in the present invention has a peak indicating a monoclinic system determined by X-ray diffraction (XRD) and has a specific surface area of 50 $m^2$/g or less determined by nitrogen adsorption.

Since such $ZrO_2$ is chemically stable and has a smaller specific surface area than an $Al_2O_3$ carrier that is usually used, the $ZrO_2$ is very hard to denature even if a sulfur-type smell component is decomposed in a long time to produce an $SO_x$ gas.

Further, since the $ZrO_2$ makes it difficult for the catalyst to adsorb moisture contained in an off-gas and a reaction intermediate or product of a sulfur-type smell component, the catalyst can exhibit a high activity at low temperatures and long-term stabilized performance.

Figure 3:
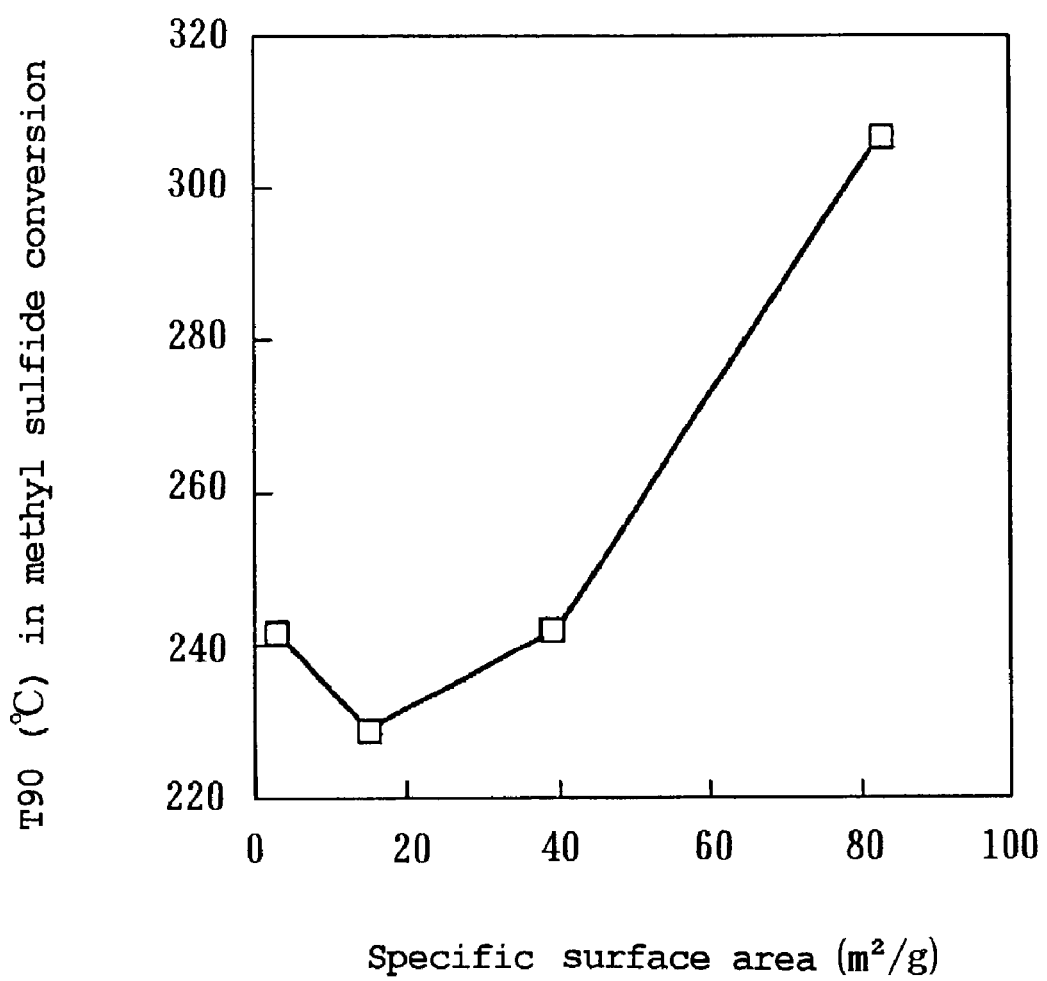
FIG. 3 is a graph showing the influence of the specific surface area of the carrier of a Pt/$ZrO_2$ catalyst upon the methyl sulfide decomposition characteristic of the catalyst.

FIG. 3 shows the low-temperature activity of the catalyst according to the present invention. Specifically, FIG. 3 shows the dependence of T90 (temperature at which 90% decomposition is reached) of the oxidative decomposition activity of methyl sulfide upon the specific surface area of a $ZrO_2$ carrier. $ZrO_2$ as a carrier exhibits a higher dispersing ability with respect to a platinum group metal than other carriers even if its specific surface area is decreased and hence is considered to allow the catalyst to exhibit a high catalytic ability.

Figure 4:
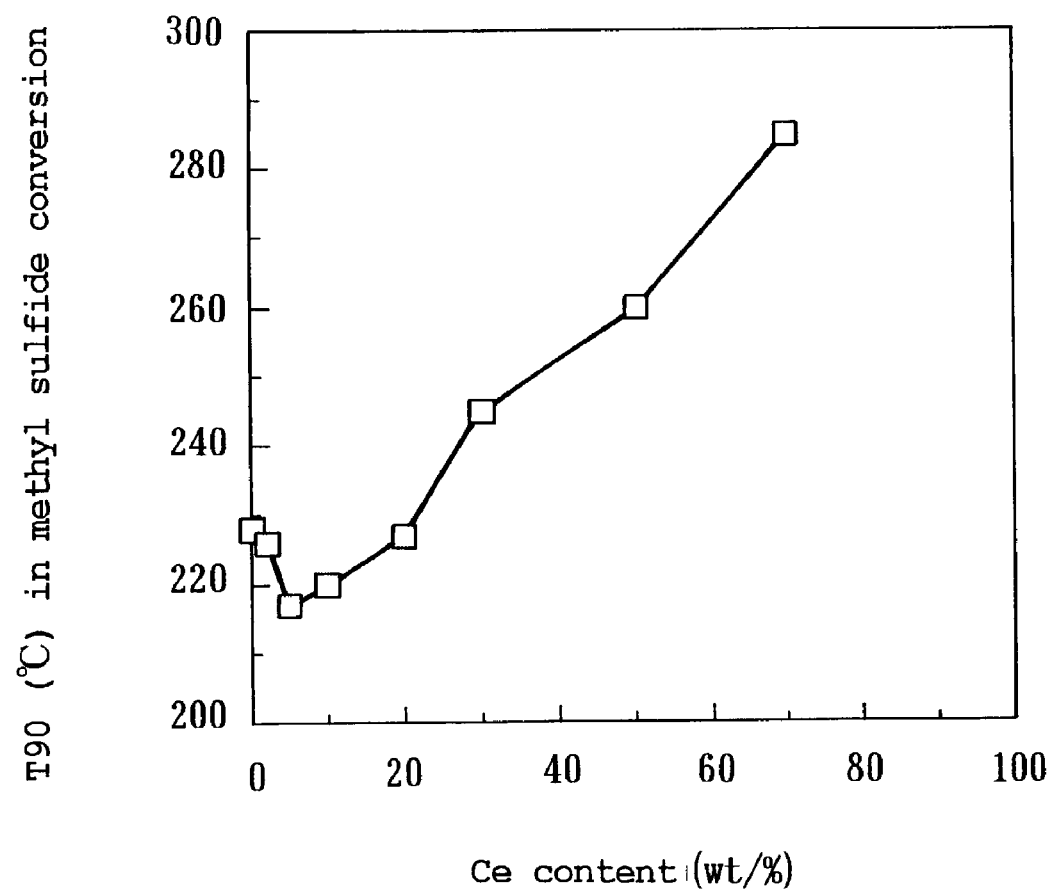
FIG. 4 is a graph showing the influence of the amount of Ce carried by a Pt/$ZrO_2$ catalyst upon the methyl sulfide decomposition characteristic of the catalyst.

With the aforementioned conditions being satisfied, it is possible to enhance the dispersibility of Pt as shown in FIG. 4 without impairing the effect of the $ZrO_2$ carrier of the present invention if Ce is turned into a composite within the range of from 0.5% to 20% and, hence, the catalyst makes it possible to ensure more complete purification.

An example of a process for making a Ce composite for use in this case comprises previously preparing a $ZrO_2$ carrier and impregnating the carrier with an aqueous solution of a Ce salt, followed by drying and calcination. The heat treatment of Ce is desirably performed at 700° C. or above. In this case, Ce crystal and $ZrO_2$ crystal grow to a certain extent separately. If a catalyst is prepared by coprecipitation of a Zr salt and a Ce salt, in contrast, the resulting $ZrO_2$ crystal is of tetragonal system and, hence, it is difficult for the resulting catalyst to exhibit performance meeting the purpose of the present invention, though the specific surface area of the carrier is larger than that of a carrier comprising only $ZrO_2$ that is heat-treated at the same temperature.

It is possible to use Ti, Mo, Eu and Tb instead of Ce though they are slightly inferior to Ce in providing this effect. On the other hand, if La, Nd or the like is turned into a composite, a resulting catalyst has a basic property and hence does not realize an improved low-temperature activity, though the degree of dispersion of Pt in the catalyst can be raised.

The purification catalyst of the present invention can be prepared in the following manner. That is, $ZrO_2$ (or its raw material such as a Zr hydroxide or a Zr nitrate) is heat-treated at a temperature of 700° C. or above to form a carrier having a monoclinic crystal system and a specific surface area of 50 $m^2$/g or less (preferably 20 $m^2$/g or less). Subsequently, the $ZrO_2$ thus heat-treated is previously impregnated with an aqueous solution of a platinum group metal such as Pt, dried and then heat-treated at a temperature of about 300° C. or higher, thereby making the $ZrO_2$ carry the platinum group metal.

This process makes it possible to make the $ZrO_2$ carry the platinum group metal more uniformly than a-process of thermally decomposing $ZrO_2$ and a salt of a platinum group metal at the same time or a process of impregnating a $ZrO_2$ film formed on a substrate with a salt of a platinum group metal to make the $ZrO_2$ film carry the platinum group metal.

After calcination of $ZrO_2$ powder carrying the platinum group metal, the calcined product is pulverized and then mixed with water, a water-soluble polymer and a water-soluble Zr salt to give a catalyst slurry. Subsequently, the catalyst slurry is applied onto a substrate (a structure) formed of a ceramic, metal, carbon or the like by dipping or a like process.

A particularly preferable water-soluble Zr salt to be contained in the catalyst slurry is zirconium oxynitrate, which can form an oxide without leaving anion pairs in a resulting catalyst while providing the effect of improving the fluidity of $ZrO_2$ particles. The water-soluble polymer provides the effect of retarding sedimentation of $ZrO_2$ particles thereby improving the dispersibility thereof. In the case of $ZrO_2$ particles having a specific surface area of 17 $m^2/g$ for example, it is possible to form a homogeneous catalyst layer on the substrate thereby to form a satisfactory purification catalyst if the amounts of these two additives (a water-soluble polymer and a water-soluble Zr salt) are each appropriately selected within the range of from 0.1% to 10% for the solid component in the slurry. The solid component in the slurry is $ZrO_2$, Pt, Zr salt and so on.

A second purification catalyst according to the present invention is as follows. Generally, a catalyst prepared by heat-treating a platinum group metal in a reducing condition has a higher catalytic activity than that prepared by heat-treating the platinum group metal in an oxidizing condition, and the difference in activity between the two becomes larger with a lowering catalysis temperature region in particular. The second catalyst according to the present invention is based on the application of this knowledge. In the preparation of the second catalyst, $ZrO_2$ impregnated with a platinum group metal salt is heat-treated in a heating furnace filled with a reducing gas such as hydrogen to cause the platinum group metal salt to be thermally decomposed so that the platinum group metal becomes metallized in a reducing condition and carried by the $ZrO_2$. Accordingly, the purification catalyst according to the present invention can exhibit an improved catalytic activity, particularly at low temperatures under high humidity conditions as compared with a catalyst using $Al_2O_3$ for example prepared by heat-treatment in an oxidizing atmosphere.

The second catalyst according to the present invention can be prepared more easily through the following preparation process. That is, $ZrO_2$ (or its raw material such as a Zr hydroxide or a Zr nitrate) for example is previously impregnated with an aqueous solution of a salt of a platinum group metal such as Pt, dried and then heat-treated in a reducing atmosphere, so that the $ZrO_2$ carries the platinum group metal.

Here, the $ZrO_2$ is previously mixed with the aqueous solution of the salt of the platinum group metal such as Pt and a water-soluble polymer material, and the resulting mixture is dried and then heat-treated to make the $ZrO_2$ carry the platinum group metal. In heat-treating a mixed solution of the aqueous solution of the platinum group metal salt and the water-soluble polymer material in a heating surface, the water-soluble polymer material reacts with oxygen present in the electric furnace to cause combustion to occur thereby maintaining the atmosphere of the heating furnace in a reducing condition. Examples of such water-soluble polymer materials include polyethylene glycol, polyvinyl alcohol, carboxymethylcellulose, and water-soluble starch. Thus, the platinum group metal is metallized in a reducing condition when the platinum group metal salt is thermally decomposed, so that the platinum group metal becomes carried by the $ZrO_2$.

With this process a catalyst having an excellent low-temperature activity can be prepared at an optimum calcination temperature of about 300° C. to about 500° C. If the carrier contains Ce or the like, lower-temperature calcination at about 200° C. is possible. It should be noted that this process may use a trace amount of a reducing agent such as hydrazine in addition to the water-soluble polymer to lower the reducing temperature. After the preparation of $ZrO_2$ powder carrying the platinum group metal, the calcined product is pulverized and then mixed with water to form a catalyst slurry. Further, the catalyst slurry is applied onto a substrate (a structure) formed of a ceramic, metal, carbon or the like by dipping or a like process.

EMBODIMENT 1

Figure 1:
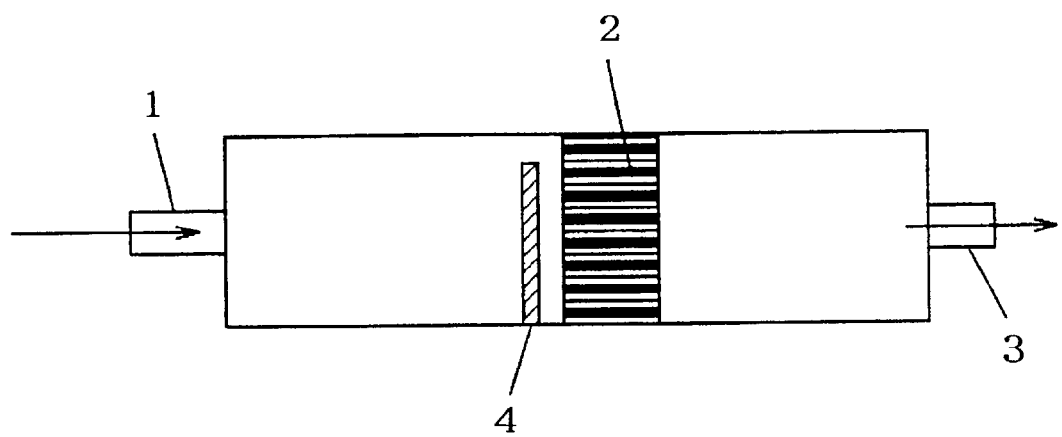
FIG. 1 is a schematic view showing a gas-purifying apparatus as embodiment 1 of the present invention.

FIG. 1 is a schematic view showing the construction of a gas-purifying apparatus according to this embodiment intended to purify an off-gas produced from a garbage disposal apparatus. The off-gas produced from the main body of the garbage disposal apparatus is introduced into the gas-purifying apparatus through an off-gas inlet 1, passed through a purification catalyst 2 comprising the aforementioned platinum group metal and $ZrO_2$, and then emitted to the atmosphere through an off-gas outlet 3. Here, the purification catalyst 2 is heated by means of a heater 4 to decompose smell components oxidatively at a very low temperature, and the decomposition products such as water and carbon dioxide gas are emitted to the atmosphere.

EMBODIMENT 2

Figure 2:
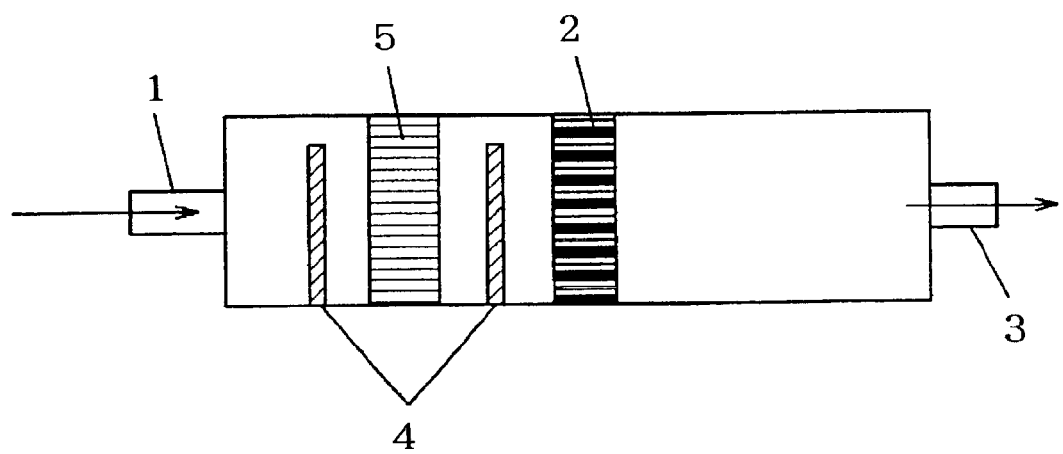
FIG. 2 is a schematic view showing a gas-purifying apparatus as embodiment 2 of the present invention.

FIG. 2 is a schematic view showing the construction of a gas-purifying apparatus according to this embodiment intended to purify an off-gas produced from a garbage disposal apparatus. In this embodiment a second purification catalyst 5 comprising an oxide of a transition metal, particularly Mn as a major component is disposed upstream of a first purification catalyst comprising a platinum group metal and $ZrO_2$ as major components.

Certain transition metal oxides are known to exhibit a decomposition activity comparable to or higher than platinum group metals with respect to some kinds of reaction gas. Among such transition metal oxides, Mn catalysts (for example, $MnO_2$ of γ- or β-crystal structure) are inexpensive and exhibit higher activity with respect to smell components such as water-soluble fatty acids and amines than platinum group metals.

An off-gas (gas to be treated) resulting from disposal of garbage contains water-insoluble smell components, a representative of which is methyl sulfide. A catalyst comprising an oxide of a transition metal such as Mn or the like exhibits a low reactivity with the water-insoluble smell components, and a poor reaction of the catalyst with such a water-insoluble smell component causes the occurrence of a poisoning phenomenon to which a reaction intermediate is considered to attend.

In view of this inconvenience, this embodiment has an arrangement wherein the second purification catalyst 5 comprising Mn as a major component is disposed upstream of the first purification catalyst 2 comprising the platinum group metal and $ZrO_2$ to cause amines and fatty acids contained in the off-gas to be reacted at low temperatures thereby purifying the off-gas, while the first purification catalyst 2 acts to lessen poisoning caused by coexistent gases, thereby enabling more complete purification even under high-humidity conditions. If the second purification catalyst 5 comprising Mn as a major component is disposed downstream of the first purification catalyst 2, the second purification catalyst 5 becomes poisoned by $SO_x$ components produced thereat. Therefore, the second purification catalyst 5 is not so effective unless it is disposed upstream of the first purification catalyst 2.

Further, if the temperature of the second purification catalyst 5 is established so as to be lower than that of the first purification catalyst 2, it is possible to retard reaction of a sulfur-type gas other than the intended gas thereby to suppress active poisoning by reaction products, as well as to save energy by virtue of the lowering of the temperature.

As shown in FIG. 2, a heater 4 may be added for heating the second purification catalyst 5, or the position of the heater 4 intermediate between the first and second purification catalysts 2 and 5 may be adjusted to adjust the temperatures of the purification catalysts 2 and 5 suitably. As the second purification catalyst 5 containing Mn as a major component used in this embodiment it is possible to use a catalyst containing Mn dispersed in and carried by a carrier comprising a chemically stable compound such as $ZrO_2$ or $TiO_2$ or a catalyst containing Mn rendered composite with another transition metal oxide in accordance with the nature of the smell of an off-gas.

Particularly, the nature of a smell produced during garbage disposal varies depending on kinds of garbage and methods of disposal (species of microorganisms, mixed conditions and the like). If garbage is protein-rich for example, a sulfur-type smell or amine-type smell becomes striking, while on the other hand, if the treatment cell in the main body of a garbage disposal apparatus is under partially anaerobic conditions, a high concentration of a fatty acid-type smell is frequently produced.

In the case where a sulfur-type smell is present in a high concentration, it is possible that the Mn-type catalyst, i.e., the second purification catalyst is prepared so that a composite oxide of Mn and at least one element selected from the group consisting of Co, W, Mo and V is produced therein in order to lessen the poisoning action of the sulfur-type smell upon the Mn-type catalyst. Further, if the concentration of Co, W, Mo or V is increased with a gradient in the direction toward the surface (to be contacted by gas flow) of the catalyst layer, it is possible to improve the activity of the Mn-type catalyst as well as to ensure the activity for a long time. Such a gradient in chemical composition can be provided through, for example, any one of the processes: a process comprising forming an Mn oxide film on a substrate and then impregnating the substrate with an aqueous solution of a salt of the aforementioned metal to cause the metal to segregate on the surface of the film; a process comprising forming an Mn oxide film in the same manner and then impregnating the substrate with a separately prepared slurry comprising fine particles of the aforementioned metal oxide to form a film of the slurry on the Mn oxide film; and a like process.

Alternatively, it is possible that the second purification catalyst is prepared so that a composite oxide of Mn and at least one element selected from the group consisting of Ag, Fe, Cu, Ce and Zr is produced therein in order to improve the activity of the Mn-type catalyst with respect to amine-type smells. Further, if the concentration of Ag, Fe, Cu, Ce or Zr is increased with a gradient in the direction toward the surface of the catalyst layer, it is possible to further improve the activity of the Mn-type catalyst upon the amine-type smells as well as to ensure the activity of such elements for a long time even in the presence of a sulfur-type smell.

In the case where an abundance of a fatty acid-type smell is produced, it is possible to improve the fatty acid-type smell retentivity of the catalyst layer thereby to improve the decomposition efficiency of the second purification catalyst 5 comprising Mn as a major component if Mn is rendered composite with a hydrophobic zeolite ion-exchanged with an alkali metal (preferably having an $SiO_2/Al_2O_3$ ratio of 10 or more). Further, if such a hydrophobic zeolite ion-exchanged with an alkali metal is provided as a lower layer (on the substrate side) situated under the Mn-type catalyst, it is possible to suppress the poisoning action of a sulfur-type smell upon the zeolite as well as to improve the fatty acid-type smell decomposition ability of the second purification catalyst. That is, the second catalyst preferably has a layered structure.

The Mn-type catalyst layer may comprise a composite of the aforementioned three types of components: i.e., at least one element selected from the group consisting of Co, W, Mo and V, at least one element selected from the group consisting of Ag, Fe, Cu, Ce and Zr, and the hydrophobic zeolite ion-exchanged with an alkali metal (preferably having an $SiO_2/Al_2O_3$ ratio of 10 or more).

The crystal structure of Mn in the Mn-type catalyst may be γ-structure which allows the catalyst to exhibit its catalytic activity fully at low temperatures. If the Mn crystal has β-structure, it is possible to lessen the influence of moisture produced abundantly in applications such as purification of an off-gas produced from a garbage disposal apparatus and the influence of a sulfur content though the activity of the Mn-type catalyst having β-structure is slightly lower than that having γ-structure. For this reason, it is preferred that the Mn-type catalyst have an analogous crystal structure even if it is mixed with other element. $Mn_2O_3$ or $Mn_3O_4$, which results from further progressed crystallization, has a decreased specific surface area and hence cannot exhibit a sufficient catalytic activity.

With the arrangement wherein the Mn-type catalyst prepared by the aforementioned means is provided as the second purification catalyst 5 to exercise its low-temperature decomposition action upon an amine-type gas and the like, it is possible to alleviate the influence of coexistent gases at the first purification catalyst as well as to suppress the production of a salt resulting from a neutralization reaction between a sulfate group produced on the first purification catalyst 2 and a basic gas such as of an amine thereby to suppress poisoning caused by physical coating over the surface of the catalyst.

EXAMPLES

Example 1

A gas-purifying apparatus as shown in FIG. 1 was connected to the off-gas outlet of a garbage disposal apparatus of a heating and biodegradation type to conduct a purification test. The test employed a purification catalyst containing each of the following carriers: (a) $ZrO_2$ (monoclinic system, specific surface area=100 m$^2$/g), (b) $ZrO_2$ (monoclinic system, specific surface area=40 m$^2$/g) , (c) $ZrO_2$ (monoclinic system, specific surface area=17 m$^2$/g), (d) Ce—$ZrO_2$ (tetragonal system, specific surface area=25 m$^2$/g, Ce/Zr=2/8) , (e) $Al_2O_3$ (commercially-available product, specific surface area=120 m$^2$/g), (f) $Al_2O_3$ (commercially-available product, specific surface area=12 m$^2$/g), (g) $CeO_2$ (specific surface area=44 m$^2$/g), (h) $TiO_2$ (commercially-available product, specific surface area=50 m$^2$/g) , and (i) Ce—$ZrO_2$ (monoclinic system, specific surface area=20 m$^2$/g, Ce/Zr=2/8).

Using any one of the carriers (a) to (i) catalyst powder carrying 2 wt % of Pt was obtained through an impregnation process and a calcination process at 400° C. for one hour. Subsequently, the catalyst power was mixed with water containing 5 wt % of polyethylene glycol and 1 wt % of zirconium oxynitrate for three hours using a ball mill to prepare a slurry. The slurry thus prepared was applied onto a honeycomb substrate (material=cordierite, 400 cells/inch$^2$) to form a catalyst layer in an amount equivalent to a Pt amount of 1.5 g/L (honeycomb capacity) on the substrate, thus forming a purification catalyst member 2.

Separately, a slurry comprising electrolytic MnO$_2$ (γ-structure, specific surface area=50 m$^2$/g), 5 wt % of a silica binder and water was prepared, and the slurry thus prepared was applied onto a honeycomb substrate identical with that described above in an amount equivalent to an MnO$_2$ amount of about 400 g/L to form a catalyst (j)- The catalyst (j) thus obtained was also subjected to a test same as above.

The purification test on an off-gas produced from the garbage disposal apparatus was performed using the gas-purifying apparatus with changing of the catalysts (a) to (j). In Example 1, an average flow rate (SV) of the off-gas resulting from garbage disposal was adjusted to 20000/h. While the temperature of the honeycomb catalyst at a central point in an upstream side of the honeycomb catalyst was 250° C. in the test, it may be established within the range of from 100° C. to 300° C. The water vapor concentration was adjusted so that the dew point of the off-gas assumed 30° C. on average. The garbage used was standard kitchen garbage comprising a mixture of predetermined amounts of foods such as cooked rice, pork and sardine and predetermined amounts of seasonings such as soy sauce and other sauces. After lapse of 15 hours from the introduction of the garbage into the garbage disposal apparatus, the concentrations of gas components responsible for representative bad smells were measured with GC at the inlet and the outlet of the apparatus to find the smell index of each of such gas components. The results of the test are shown in Table 1.

TABLE 1

| Carrier | Trimethylamine | Propionic acid | Methyl sulfide |
|---|---|---|---|
| Original smell index | 4.5 | 3.5 | 3.5 |
| (a) | 2.3 | 1.7 | 1.3 |
| (b) | 0.6 | 1.0 | 0.1 |
| (c) | 0.7 | 1.1 | 0 |
| (d) | 1.5 | 1.8 | 2.5 |
| (e) | 2.7 | 2.3 | 0.8 |
| (f) | 2.5 | 2.4 | 2.0 |
| (g) | 1.8 | 1.8 | 2.2 |
| (h) | 2.3 | 1.7 | 1.5 |
| (i) | 0.5 | 0.9 | 0.3 |
| (j) | 0.8 | 1.6 | 3.4 |

It became apparent from the results that catalysts (b) and (c) each using ZrO$_2$ having a monoclinic crystal system and a specific surface area of 50 m$^2$/g or less had a high activity at low temperatures and provided a high purification effect even when used in an actual apparatus.

On the other hand, catalyst (d) having tetragonal crystal system did not exhibit sufficient performance with respect to methyl sulfide in particular. In contrast, catalyst (i) having a monoclinic crystal system but containing Ce like catalyst (d) exhibited higher performance than did catalyst (c). Instead of Ce, it is possible to use Eu, Tb or Pr though they are somewhat inferior to Ce in providing this effect.

With respect to catalyst (e) using activated alumina (Al$_2$O$_3$), which is frequently used in general, SO$_x$ resulting from decomposition of methyl sulfide and aluminum sulfate resulting from the reaction between methyl sulfide and aluminum were observed after the reaction. Further, the surface of catalyst (e) was color-changed to brown due to a substance that seemed to be a polymeric substance.

Catalyst (f) using alumina having a smaller specific surface area and catalyst (g) using CeO$_2$ also having a small specific surface area did not exhibit sufficient performance. As can be understood from this fact, a sufficient low-temperature activity can result not from a single characteristic that the surface area is small but from a combination of this characteristic and the use of ZrO$_2$.

Catalyst (j) using MnO$_2$ alone exhibited little purification performance upon methyl sulfide though exhibiting a high purification activity upon an amine-type smell, and its performance was observed to lower in a short time due to poisoning.

Example 2

Example 2 is an example of gas purification in a reducing environment.

A purification test was conducted with a gas-purifying apparatus as shown in FIG. 1 being connected to the off-gas outlet of a garbage disposal apparatus as in Example 1 and with the water vapor concentration being adjusted so that the dew point of the off gas assumed 40° C., which was higher than the dew point established in Example 1. The test employed each of the following purification catalysts: catalyst (a) prepared through a process comprising previously mixing ZrO$_2$ (monoclinic system, specific surface area=17 m$^2$/g) with an aqueous solution of a Pt salt and a water-soluble starch, drying the mixture, and then heat-treating the mixture at 400° C. to make ZrO$_2$ carry 2 wt % of a Pt catalyst metallized under a reducing condition; catalyst (b) prepared through a process comprising previously mixing ZrO$_2$ (monoclinic system, specific surface area=40 m$^2$/g) with an aqueous solution of a Pt salt and a water-soluble starch, drying the mixture, and then heat-treating the mixture at 400° C. to make ZrO$_2$ carry 2 wt % of a Pt catalyst metallized under a reducing condition; and catalyst (c) prepared through a process comprising previously mixing ZrO$_2$ (monoclinic system, specific surface area=100 m$^2$/g) with an aqueous solution of a Pt salt and a water-soluble starch, drying the mixture, and then heat-treating the mixture at 400° C. to make ZrO$_2$ carry 2 wt % of a Pt catalyst metallized under a reducing condition. In the same manner as in Example 1, each of these catalysts was turned into a slurry, which in turn was applied onto a honeycomb substrate (material=cordierite, 400 cells/inch $^2$) to form a catalyst layer in an amount equivalent to a Pt amount of 1.5 g/L (honeycomb capacity) on the substrate.

The purification test on the off-gas produced from the garbage disposal apparatus was performed using the gas-purifying apparatus with changing of the catalysts (a), (b) and (c).

TABLE 2

| Carrier | Trimethylamine | Propionic acid | Methyl sulfide |
|---|---|---|---|
| Original smell index | 4.5 | 3.5 | 3.5 |
| Example 1 (c) | 1.0 | 1.5 | 0.3 |
| Example 2 (a) | 0.6 | 1.0 | 0.2 |
| Example 2 (b) | 0.7 | 1.1 | 0.1 |
| Example 2 (c) | 2.5 | 1.9 | 1.4 |

As seen from the results thus obtained, in the case where the off-gas had a raised dew point and an increased water vapor concentration, example 1(c) carrying Pt in the form of PtO or $PtO_2$ allowed a rise in smell strength to occur, while examples 2(a) and 2(b) each carrying Pt in a metallized form, i.e., in the form of Pt as it is were observed to have improvements in decomposition rate, their effects being outstanding with respect to trimethylamine and propionic acid in particular. Example 2(c) having a large specific surface area did not exhibit a sufficient effect in controlling the oxidized state of Pt. In conclusion, a catalyst carrying metallized Pt on $ZrO_2$ having a specific surface area of 50 $m^2/g$ or less can exhibit improved purification performance even under a high water vapor concentration condition. Though it is possible to obtain a catalyst carrying metallized Pt by calcination of a Pt catalyst in a hydrogen stream, a simpler process in which a water-soluble polymer is coexistent with Pt makes it possible to obtain a catalyst exhibiting a comparable activity.

Example 3

A purification test was conducted with a gas-purifying apparatus as shown in FIG. 2 being connected to the off-gas outlet of a garbage disposal apparatus as in Example 1 and with the dew point of the off-gas being adjusted to 40° C. on average. The first purification catalyst 2 used in the gas-purifying apparatus shown in FIG. 2 was prepared in the same manner as in Example 1 through a process comprising applying $ZrO_2$ (heat-treatment temperature =1000° C., specific surface area=17 $m^2/g$) carrying 2 wt % of Pt onto a honeycomb substrate (material=cordierite, 400 cells/$inch^2$) to form a catalyst layer in an amount equivalent to a Pt amount of 1.5 g/L on the substrate.

The second purification catalyst 5 used in the gas-purifying apparatus was catalyst (a) prepared through a process comprising applying electrolytic $MnO_2$ of a γ-structure onto a honeycomb substrate (material=cordierite, 400 cells/$inch^2$) to form a catalyst layer in an amount equivalent to about 400 g/L on the substrate, or catalyst (b) prepared through a process comprising applying Pt (2wt %).$Al_2O_3$ (specific surface area=120 $m^2/g$) onto a honeycomb substrate (material=cordierite, 400 cells/$inch^2$) to form a catalyst layer in an amount equivalent to a Pt amount of 1.5 g/L on the substrate in the same manner as in Example 1. The calcination temperature in the preparation of catalyst (a) was adjusted to 300° C. as with example 1(j).

Here, the first purification catalyst 2 and the second purification catalyst 5 were each sized so that an average gas flow rate SV with respect to each of the catalysts 2 and 5 assumed 40000. The temperature of the first catalyst 2 at a central point in an upstream side of the first catalyst 2 was adjusted to 250° C., while the temperature of the second catalyst 5 at a similar point was adjusted to 180° C. As a result, the smell strength of each smell component assumed a value shown in Table 3.

TABLE 3

| Carrier | Trimethylamine | Propionic acid | Methyl sulfide |
|---|---|---|---|
| Original smell index | 4.5 | 3.5 | 3.5 |
| Example 1 (c) | 1.0 | 1.5 | 0.3 |
| Example 3 (a) | 0.7 | 1.2 | 0 |
| Example 3 (b) | 1.3 | 2.0 | 1.0 |

As seen from the results thus obtained, the gas-purifying apparatus having an example 3(a) arrangement exhibited excellent purification performance with respect to all the gases as compared with example 1(c) that exhibited the highest performance among the catalysts using the platinum group metal. Since the gas-purifying apparatus having the example 3(a) arrangement enables decomposition at low temperatures, it is excellent in energy-saving performance.

When the temperature of the second purification catalyst 5 was raised to 250° C., there was a tendency that it was more poisoned. Presumably, this is because the proportion of $SO_3$ changed from $SO_2$ resulting from decomposition of a sulfur compound becomes higher with rising temperature, so that $SO_3$ reacts with Mn or the like to form a compound. Therefore, in ensuring excellent purification performance of the subject arrangement at a lower temperature relative to the heating temperature, the temperature of the first purification catalyst 2 is preferably adjusted to fall within the range of from about 230° C. to about 330° C., while the temperature of the second purification catalyst 5 is preferably adjusted to 250 ° C. or below, more preferably within the range of from about 180 ° C. to about 230° C. Though the purification catalysts of this Example were used in the gas-purifying apparatus for use with a garbage disposal apparatus, they can be used in other applications and can provide satisfactory effects if they are used in purification of a smell component containing a sulfur-type smell in particular.

Example 4

Figure 5:
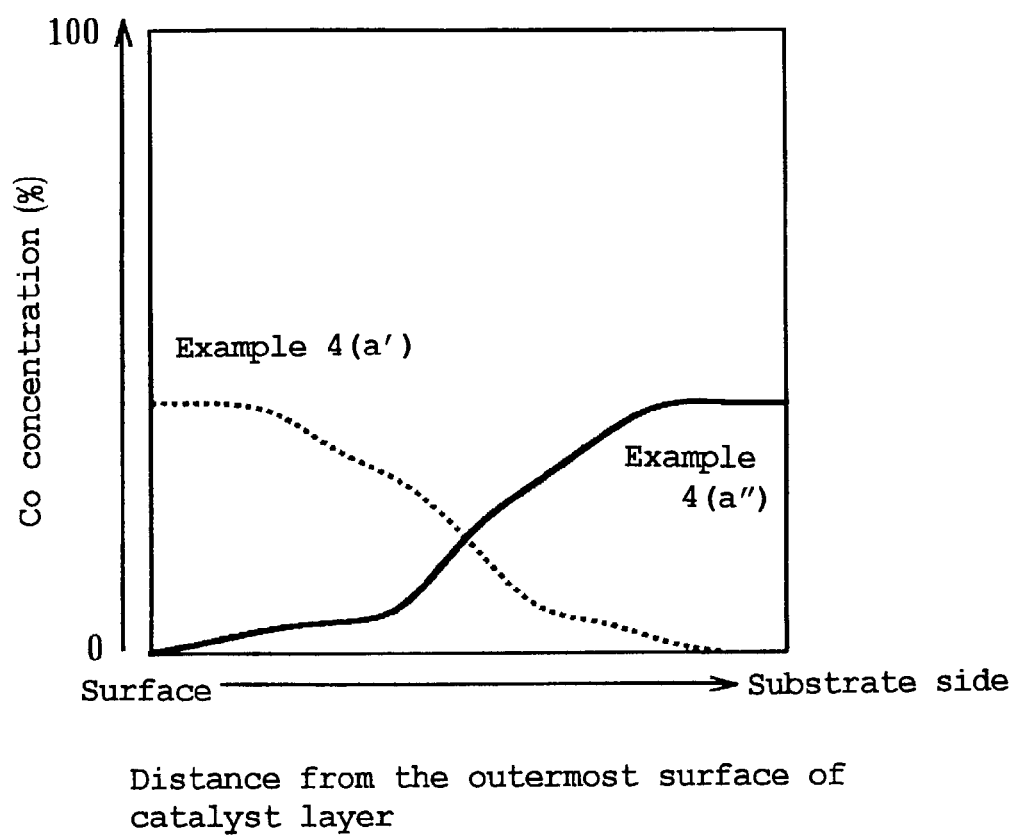
FIG. 5 is a graph showing a Co concentration at a section of the catalyst layer of each of examples 4(a') and 4(a").

Example 4 was the same as Example 3 in basic arrangement, test conditions and first purification catalyst 2 except second catalyst 5 used in the gas-purifying apparatus shown in FIG. 2. Catalysts for use as the second catalyst 5 in this Example included catalysts each prepared through a process comprising applying a catalyst comprising electrolytic Mn of ã-structure rendered composite with 20 at % of each of Co (a), W (b), Mo (c), V (d), Ag (e), Fe (f), Cu (g), Ce (h) and Zr (i) onto a honeycomb substrate (material=cordierite, 400 cells/$inch^2$) to form a catalyst layer in an amount equivalent to about 400 g/L on the substrate. A composite compound of Mn and each of these elements was prepared by impregnating electrolytic manganese dioxide with an aqueous solution of a nitrate or an ammonium salt, followed by a heat treatment at 300° C. for one hour. The resulting calcined product was turned into a slurry, which was then used in the formation of the catalyst film of the second purification catalyst 5. Separately, catalyst layers (a') and (h') were formed using Co (a) and Ce (h), respectively so that the concentrations of Co (a) and Ce (h) were increased with a gradient in the direction toward the surfaces of respective layers. On the other hand, catalyst layers (a") and (h") were formed using Co (a) and Ce (h), respectively so that the concentrations of Co (a) and Ce (h) were decreased with a gradient in the direction toward the surfaces of respective layers reversely of the catalyst layers (a') and (h'). These catalyst layers (a'), (h'), (") and (h") were used in a test same as performed on the catalysts using respective elements (a) to (i). The catalyst layers (a') and (h') were each formed through a process comprising preparing a slurry comprising electrolytic manganese dioxide and cobalt nitrate or cerium nitrate and impregnating a honeycomb substrate identical with those described above with the slurry. The catalyst layers (a") and (h") were each formed through a process comprising previously forming a film composed of a hydroxide of Co or Ce on a honeycomb substrate identical with those described above and applying a slurry comprising electrolytic manganese dioxide (80 wt %) and an aqueous solution of manganese nitrate (20 wt % as $MnO_2$) onto the honeycomb substrate to form a film thereon. FIG. 5 shows the Co concentration distribution of each of the catalyst layers (a') and (a") in the thickness wise direction of each layer determined by XMA analysis, the catalyst layers (a') and (a") each containing Co rendered composite with $MnO_2$ with a gradient.

For comparison, catalysts each comprising a composite of 20 at % of each of Al (j), Si (k), K (l) and Sr (m) similarly to the above were also examined.

Further, catalyst (n) comprising Co (a) heat-treated at 400° C. and an Mn oxide of β-crystal structure and catalyst (o) comprising $Mn_2O_3$ heat-treated at 550° C. were also used as the second purification catalyst 5 in the test.

In the same manner as in Example 3 the first purification catalyst 2 and the second purification catalyst 5 were each sized so that an average gas flow rate SV with respect to each of the catalysts 2 and 5 assumed 40000. The temperature of the first catalyst 2 at a central point in an upstream sideof the first catalyst 2 was adjusted to 250° C., while the temperature of the second catalyst 5 at a similar point was adjusted to 180° C. As a result, the smell strength of each smell component assumed a value shown in Table 4.

The gas-purifying apparatus of the arrangement using the first and second catalysts as shown in FIG. 2 was subjected to a 10000 hr-equivalent durability test using a model smell comprising trimethylamine, propionic acid and methyl sulfide and having a smell concentration about 100 times as high as the smell concentration of an off-gas discharged from a garbage disposal apparatus at the same temperature and under the same SV condition. Thereafter, an off-gas resulting from garbage disposal was introduced into the gas-purifying apparatus and the smell strength of the off-gas at the outlet of the gas-purifying apparatus was measured. The results of the measurement are parenthesized in Table 4.

TABLE 4

| Carrier | Trimethylamine | Propionic acid | Methyl sulfide |
|---|---|---|---|
| Original smell index | 4.5 | 3.5 | 3.5 |
| Example 3 (a) | 0.7 (1.6) | 1.2 (2.0) | 0 (0.8) |
| Example 4 (a) | 0.6 (1.0) | 0.8 (1.0) | 0 (0.3) |
| Example 4 (a') | 0.6 (0.5) | 0.8 (0.8) | 0 (0.1) |
| Example 4 (a") | 0.7 (1.1) | 0.8 (1.3) | 0 (0.4) |
| Example 4 (b) | 0.8 (0.8) | 1.0 (1.1) | 0 (0.3) |
| Example 4 (c) | 0.7 (0.8) | 0.9 (1.0) | 0 (0.3) |
| Example 4 (d) | 0.7 (0.8) | 1.1 (1.2) | 0 (0.3) |
| Example 4 (e) | 0.5 (1.1) | 0.8 (1.2) | 0 (0.3) |
| Example 4 (f) | 0.4 (1.0) | 0.9 (1.4) | 0 (0.4) |
| Example 4 (g) | 0.5 (0.9) | 0.8 (1.4) | 0 (0.4) |
| Example 4 (h) | 0.4 (0.8) | 0.7 (1.3) | 0 (0.4) |
| Example 4 (h') | 0.5 (1.0) | 0.8 (1.5) | 0 (0.5) |
| Example 4 (h") | 0.5 (0.6) | 0.8 (1.0) | 0 (0.1) |
| Example 4 (i) | 0.5 (0.7) | 0.9 (1.3) | 0 (0.2) |
| Example 4 (j) | 0.7 (1.7) | 1.2 (2.0) | 0 (0.8) |
| Example 4 (k) | 0.7 (1.6) | 1.2 (1.9) | 0 (0.8) |
| Example 4 (l) | 1.0 (2.3) | 0.9 (1.8) | 0 (0.8) |
| Example 4 (m) | 0.9 (2.2) | 0.7 (1.6) | 0 (0.9) |
| Example 4 (n) | 0.7 (1.0) | 1.3 (1.5) | 0 (0.4) |
| Example 4 (o) | 1.3 (1.8) | 2.0 (2.4) | 0.5 (0.9) |

It is apparent from the results shown in Table 4 that the combination of the first purification catalyst and each of examples 4(e), 4(f), 4(g), 4(h) and 4(i) each comprising a composite of Mn and Ag, Fe, Cu, Ce or Zr can exhibit more improved decomposition activity with respect to trimethylamine and propionic acid in its initial state than example 3(a) having the second purification catalyst 5 formed of electrolytic $MnO_2$. As compared with example 4(h) comprising Ce evenly rendered composite with Mn, example (h") in which the Ce concentration of the catalyst layer was decreased with a gradient in the direction toward the surface of the catalyst layer exhibited a relatively small degradation in performance. Example 4(h) formed an active side with respect to amines and the like and became highly reactive with methyl sulfide because a composite of Mn and Ce was produced, with the result that poisoning occurred though the initial activity thereof was high.

With respect to example 4(h"), in contrast, it is considered that the performance of the active site formed by the composite of Mn and Ce, the concentration of Ce increasing from the surface toward the bulk of the catalyst layer, was relatively maintained because the Mn concentration of the catalyst layer increased toward the surface side brought into contact with the gas, so that the reaction with methyl sulfide was suppressed. Any one of the elements used in examples 4(e) to 4(i) can provide a similar effect as did Ce.

Examples 4(a), 4(b), 4(c) and 4(d), respectively, comprising Co, W, Mo and V rendered composite with $MnO_2$ incurred less decrease in decomposition rate with respect to trimethylamine and propionic acid though they were inferior in initial activity to examples 4(e), 4(f), 4(g), 4(h) and 4(i). Thus, examples 4(a) to 4(d) can realize the effect of the subject arrangement for a long period even under the conditions where the temperature is low and plural smell components are present. Particularly, example 4(a) comprising Co rendered composite with $MnO_2$ forms lattice defect based on Co and Mn and hence is capable of improving the activity site with respect to amines and fatty acids while exhibiting an effect of Co against sulfur poisoning. Example 4(a') is capable of exhibiting further improved anti-poisoning performance because the Co concentration of the catalyst layer is much higher at the surface of the catalyst layer. Any one of the elements used in examples 4(b) to 4(d) can provide a similar effect as did Co.

Examples 4(j), 4(k), 4(l) and 4(m), respectively, comprising Al, Si, K and Sr rendered composite with $MnO_2$ were generally comparable to the catalyst comprising Mn alone. Some of them exhibited a slightly improved decomposition activity, while some of them were easy to exhibit lowered performance due to poisoning.

Example 4(n) comprising Mn of β-structure had excellent durability against sulfur components though its decomposition activity with respect to propionic acid was slightly lowered. The low-temperature purification activity and durability of example 4(n) can further be improved if Mn of β-structure is rendered composite with each of the elements used in examples 4(a) to 4(i).

The amount of a metal component to be rendered composite with Mn is preferably within the range of from 5 to 40 at %, more preferably from 10 to 30 at %, though it was 20 at % in this Example.

Example 5

Example 5 was the same as Example 3 in basic arrangement, test conditions and first purification catalyst 2 except second catalyst 5 used in the gas-purifying apparatus shown in FIG. 2. The second catalyst 5 used in this Example was prepared through a process comprising applying a slurry comprising zeolite dispersed in water onto a honeycomb substrate (material=cordierite, 400 cells/inch$^2$) to form a catalyst layer in an amount equivalent to a zeolite amount of 200 g/L on the substrate and then applying 200 g/L of $MnO_2$ onto the substrate. Example 5(a) was a catalyst using Na-type zeolite (Na content=1.5 wt %, $SiO_2/Al_2O_3$ ratio=900, specific surface area=400 m$^2$/g) as the zeolite carried in a lower layer situated under the $MnO_2$ catalyst, while example 5(a') was a catalyst prepared through a process comprising physically mixing Na type zeolite with $MnO_2$ and then applying the mixture onto a substrate to form a homogeneous catalyst layer thereon. For comparison, a catalyst using zeolite that was similar to that described above but was of proton type was prepared as example 5(b).

TABLE 5

| Carrier | Trimethylamine | Propionic acid | Methyl sulfide |
|---|---|---|---|
| Original smell index | 4.5 | 3.5 | 3.5 |
| Example 3 (a) | 0.7 | 1.2 | 0.2 |
| Example 5 (a) | 0.7 | 0.6 | 0 |
| Example 5 (a') | 0.8 | 0.8 | 0.1 |
| Example 5 (b) | 0.9 | 1.1 | 0.3 |

As can be understood from the results thus obtained, the catalyst comprising zeolite ion-exchanged with Na as a lower layer situated under the $MnO_2$ layer can exhibit an improved fatty acid decomposition rate thereby ensuring further favorable purification characteristics. Zeolite for use in this Example may be ion-exchanged with any other alkali metal than Na. The $SiO_2/Al_2O_3$ ratio of such zeolite is preferably 10 or more. Particularly preferably, zeolite is what is called "hydrophobic zeolite". Though the ratio of zeolite to Mn catalyst rendered composite with each other was 1:1 in this Example, it may be established as desired according to the nature of a smell.

With use of the purification catalyst comprising $ZrO_2$ having a specific surface area of 50 $m^2/g$ or less and a monoclinic crystal system according to the present invention it is possible to perform highly efficient gas purification at lower temperatures over a long period of time.

With respect to the purification catalyst comprising a metal oxide and a platinum group metal, if the platinum group metal is carried by the metal oxide through reduction of a salt of the platinum group metal, the purification catalyst can exhibit an improved activity under high-humidity conditions, particularly at low temperatures.

The gas-purifying apparatus employing the purification catalyst comprising $ZrO_2$ having a specific surface area of 50 $m^2/g$ or less and a monoclinic crystal system according to the present invention, wherein the aforementioned purification catalyst is used as the first purification catalyst, while a purification catalyst comprising a metal oxide containing Mn as a major component is used as the second purification catalyst disposed upstream of the first purification catalyst, makes it possible to alleviate a chemical or physical poisoning action caused by the influence of coexistent gases, whereby the performance of the first purification catalyst can be fully utilized, so that highly efficient gas purification at low temperatures (which realizes high energy-saving performance) becomes possible. This effect can be enhanced if Mn is rendered composite with any one of Co, W, Mo and V, or any one of Ag, Fe, Cu, Ce and Zr, or zeolite carrying an alkali metal, thereby ensuring satisfactory performance for a long period of time.

What is claimed is:

1. A purification catalyst comprising a carrier formed of $ZrO_2$ having a monoclinic crystal system, and a platinum group metal carried by the carrier, wherein the $ZrO_2$ has a specific surface area of 50 $m^2/g$ or less.

2. The purification catalyst according to claim 1, wherein the $ZrO_2$ carries a metal oxide of an element selected from the group consisting of Ce, Ti, Mo, Tb and Eu in a total amount of from 0.5 to 30 wt %.

3. The purification catalyst according to claim 2, wherein the platinum group metal is platinum.

4. The purification catalyst according to claim 3, wherein the metal oxide is a metal oxide of Ce.

5. The purification catalyst according to claim 2, wherein the metal oxide is a metal oxide of Ce.

6. The purification catalyst according to claim 1, wherein the platinum group metal is platinum.

* * * * *

UNITED STATES PATENT AND TRADEMARK OFFICE
CERTIFICATE OF CORRECTION

| | |
|---|---|
| PATENT NO. | : 7,223,715 B2 |
| APPLICATION NO. | : 10/225792 |
| DATED | : May 29, 2007 |
| INVENTOR(S) | : Tetsuo Terashima et al. |

It is certified that error appears in the above-identified patent and that said Letters Patent is hereby corrected as shown below:

Column 16
Claim 1, delete "wherein the $ZrO_2$ has a specific surface area of 50 $m^2/g$ or less," so that claim 1 reads as follows:

-- A purification catalyst comprising a carrier formed of $ZrO_2$ having a monoclinic crystal system, and a platinum group metal carried by the carrier, wherein the $ZrO_2$ has a specific surface area of 20 $m^2/g$ or less. --

Signed and Sealed this

Twenty-third Day of October, 2007

JON W. DUDAS
*Director of the United States Patent and Trademark Office*